United States Patent
Tian et al.

(10) Patent No.: US 11,238,097 B2
(45) Date of Patent: Feb. 1, 2022

(54) METHOD AND APPARATUS FOR RECALLING NEWS BASED ON ARTIFICIAL INTELLIGENCE, DEVICE AND STORAGE MEDIUM

(71) Applicant: BEIJING BAIDU NETCOM SCIENCE AND TECHNOLOGY CO., LTD., Haidian District Beijing (CN)

(72) Inventors: Zhiliang Tian, Beijing (CN); Daxiang Dong, Beijing (CN); Dianhai Yu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 832 days.

(21) Appl. No.: 16/000,160

(22) Filed: Jun. 5, 2018

(65) Prior Publication Data

US 2018/0349512 A1    Dec. 6, 2018

(30) Foreign Application Priority Data

Jun. 5, 2017 (CN) .......................... 201710413884.7

(51) Int. Cl.
*G06N 3/00* (2006.01)
*G06F 16/901* (2019.01)
(Continued)

(52) U.S. Cl.
CPC ....... *G06F 16/9027* (2019.01); *G06N 3/0454* (2013.01); *G06N 5/022* (2013.01);
(Continued)

(58) Field of Classification Search
CPC .................................................. G06F 16/9027
See application file for complete search history.

(56) References Cited

U.S. PATENT DOCUMENTS

| | | | | |
|---|---|---|---|---|
| 5,864,650 A | * | 1/1999 | Taniguchi | ............... G10L 19/04 704/220 |
| 2012/0265744 A1 | * | 10/2012 | Berkowitz | ......... G06Q 30/0613 707/705 |

(Continued)

FOREIGN PATENT DOCUMENTS

| | | |
|---|---|---|
| CN | 101430708 A | 5/2009 |
| CN | 104484431 A | 4/2015 |

(Continued)

OTHER PUBLICATIONS

Berkowitz Oct. 22, 2012.*

(Continued)

*Primary Examiner* — Tuankhanh D Phan
(74) *Attorney, Agent, or Firm* — Brooks Kushman P.C.

(57) ABSTRACT

A method and apparatus for recalling news based on artificial intelligence, a device and a storage medium. The method comprises: building an index repository according to candidate news, the index repository including M search trees, each search tree being a complete binary tree including at least two layers, each non-leaf node in each search tree corresponding to a semantic index vector, each piece of candidate news corresponding to a leaf node in each search tree; when news needs to be recommended to the user, generating a user's semantic index vector according to the user's interest tag; with respect to each search tree, respectively according to semantic index vectors corresponding to non-leaf nodes therein and the user's semantic index vector, determining a path from a first layer of non-leaf nodes to a leaf node, and regarding candidate news corresponding to the leaf node on the path as a recall result.

18 Claims, 8 Drawing Sheets

(51) Int. Cl.
*G06N 5/02* (2006.01)
*G06N 3/04* (2006.01)
*G06F 40/30* (2020.01)

(52) U.S. Cl.
CPC ............ *G06F 40/30* (2020.01); *G06N 3/0427* (2013.01); *G06N 3/0445* (2013.01)

(56) References Cited

U.S. PATENT DOCUMENTS

| | | | |
|---|---|---|---|
| 2013/0254290 A1* | 9/2013 | Grossman | H04L 67/306 709/204 |
| 2017/0091319 A1* | 3/2017 | Legrand | G06F 16/3346 |
| 2019/0294709 A1* | 9/2019 | Gupta | G06F 16/24553 |

FOREIGN PATENT DOCUMENTS

| | | | |
|---|---|---|---|
| CN | 106095762 A | 11/2016 | |
| CN | 106202131 A | 12/2016 | |
| CN | 106407425 A | 2/2017 | |

OTHER PUBLICATIONS

Lotfabadi Maryam. Sep. 2016. Rough Set Theory to Improve Content Based Image Retrieval System. Sep. 2016.*
Chinese Office Action dated Mar. 26, 2020, for related Chinese Appln. No. 201710413884.7; 8 Pages.
Chinese Search Report dated Mar. 19, 2020 for related Chinese Appln. No. 201710413884.7; 2 Pages.

* cited by examiner

METHOD AND APPARATUS FOR RECALLING NEWS BASED ON ARTIFICIAL INTELLIGENCE, DEVICE AND STORAGE MEDIUM

The present application claims the priority of Chinese Patent Application No. 2017104138847, filed on Jun. 5, 2017, with the title of "Method and apparatus for recalling news based on artificial intelligence, device and storage medium". The disclosure of the above applications is incorporated herein by reference in its entirety.

FIELD OF THE DISCLOSURE

The present disclosure relates to the Internet technologies, and particularly to a method and apparatus for recalling news based on artificial intelligence, a device and a storage medium.

BACKGROUND OF THE DISCLOSURE

Artificial intelligence AI is a new technical science for researching and developing theories, methods, technologies and application systems for simulating, extending and expanding human intelligence. Artificial intelligence is a branch of computer sciences and attempts to learn about the essence of intelligence, and produces a new intelligent machine capable of responding in a manner similar to human intelligence. The studies in the field comprise robots, language recognition, image recognition, natural language processing, expert systems and the like.

In the information era, as the Internet technologies develop, more and more news and information enters the field of vision of the public, and news-related products are closely related to the Internet users' daily life.

Automatically-recommended news products such as "toutiao" gradually appeals to users. Such products are characterized by no news editing or very little news editing performed by the product developer, mainly mining news from other news websites, and recommending news to users according to user's likes and dislikes and concerns for the heat of the news itself.

Commonly-used news recommending manners include:

1) Recommend news with a high click rate, i.e., upon recommending news, only news with a high click rate is recommended without considering the user's interests. This manner causes the recommended news less purposeful and less relevant to the user so that the accuracy of the recommendation result is low.

2) Semantic similarity algorithm based on a Deep Neural Network (DNN), i.e., use the DNN-based semantic similarity algorithm to calculate a semantic similarity of all candidate news and the user, and recommend candidate news meeting similarity requirements to the user. This manner has a very high calculation complexity and is very time-consuming in calculation.

SUMMARY OF THE DISCLOSURE

In view of the above, the present disclosure provides a method and apparatus for recalling news based on artificial intelligence, a device and a storage medium, which can improve the accuracy of news recommendation results and reduce the calculation complexity and the time spent in calculation.

Specific technical solutions are as follows:

A method for recalling news based on artificial intelligence, comprising:
building an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree;
when news needs to be recommended to the user, generating a user's semantic index vector according to the user's interest tag;
with respect to each search tree, respectively according to semantic index vectors corresponding to non-leaf nodes therein and the user's semantic index vector, determining a path from a first layer of non-leaf nodes to a leaf node, and regarding candidate news corresponding to the leaf node on the path as a recall result.

According to a preferred embodiment of the present disclosure, the building an index repository according to candidate news comprises:
generating the semantic index vector of each piece of candidate news according to a tag of each piece of candidate news;
building the index repository according to the semantic index vectors of all candidate news.

According to a preferred embodiment of the present disclosure, the generating the semantic index vector of each piece of candidate news according to a tag of each piece of candidate news comprises:
inputting tags of candidate news into a first semantic index vector generating model obtained by pre-training, to obtain the semantic index vectors of the candidate news;
the generating a user's semantic index vector according to the user's interest tag comprises:
inputting the user's interest tag into a second semantic index vector generating model obtained by per-training, to obtain the user's semantic index vector.

According to a preferred embodiment of the present disclosure, the building the index repository according to the semantic index vectors of all candidate news comprises:
building M search trees, each search tree being a complete binary tree including at least two layers, each non-leaf node in each search tree corresponding to a semantic index vector;
performing the following processing with respect to each piece of candidate news:
with respect to each search tree, respectively according to the semantic index vectors corresponding to non-leaf nodes therein and the semantic index vectors of the candidate news, determining a path from a first layer of non-leaf nodes to a leaf node, and regarding the candidate news as candidate news corresponding to the leaf node on the path.

According to a preferred embodiment of the present disclosure, the step of, according to the semantic index vectors corresponding to non-leaf nodes therein and the semantic index vectors of the candidate news, determining a path from a first layer of non-leaf nodes to a leaf node, and regarding the candidate news as candidate news corresponding to the leaf node on the path comprises:
regarding a first layer of non-leaf nodes in the search tree as a start of a path, regarding the first layer of non-leaf nodes as to-be-processed non-leaf nodes, and performing the following predetermined processing:
performing linear projection for semantic index vectors of the candidate news and semantic index vectors corresponding to the to-be-processed non-leaf nodes, selecting a node from next layer of nodes of the to-be-processed non-leaf nodes according to a projection result, and adding the node into the path;

when the selected node is a non-leaf node, regarding the selected non-leaf node as the to-be-processed non-leaf node, and repeatedly performing the predetermined processing;

when the selected node is a leaf node, determine the candidate news as candidate news corresponding to the leaf node.

According to a preferred embodiment of the present disclosure, each non-leaf node in each search tree corresponding to a semantic index vector comprises:

each non-leaf node in each search tree corresponds to a randomly-generated semantic index vector.

According to a preferred embodiment of the present disclosure, the step of, according to semantic index vectors corresponding to non-leaf nodes therein and the user's semantic index vector, determining a path from a first layer of non-leaf nodes to a leaf node, and regarding candidate news corresponding to the leaf node on the path as a recall result comprises:

regarding a first layer of non-leaf nodes in the search tree as a start of a path, and regarding the first layer of non-leaf nodes as to-be-processed non-leaf nodes, and performing the following predetermined processing:

performing linear projection for the user's semantic index vector and semantic index vectors corresponding to the to-be-processed non-leaf nodes, selecting a node from next layer of nodes of the to-be-processed non-leaf nodes according to a projection result, and adding the node into the path;

when the selected node is a non-leaf node, regarding the selected non-leaf node as the to-be-processed non-leaf node, and repeatedly performing the predetermined processing;

when the selected node is a leaf node, regarding candidate news corresponding to the leaf node as a recall result.

According to a preferred embodiment of the present disclosure, the selecting a node from next layer of nodes of the to-be-processed non-leaf nodes according to a projection result comprises:

when the projection result is positive, regarding a left node in the next layer of nodes as the selected node; when the projection result is negative, regarding a right node in the next layer of nodes as the selected node;

or, when the projection result is negative, regarding a left node in the next layer of nodes as the selected node; when the projection result is positive, regarding a right node in the next layer of nodes as the selected node.

An apparatus of recalling news based on artificial intelligence, comprising: a repository building unit and a searching unit;

the repository building unit is configured to build an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree;

the searching unit is configured to, when news needs to be recommended to the user, generate a user's semantic index vector according to the user's interest tag; with respect to each search tree, respectively according to semantic index vectors corresponding to non-leaf nodes therein and the user's semantic index vector, determine a path from a first layer of non-leaf nodes to a leaf node, and regard candidate news corresponding to the leaf node on the path as a recall result.

According to a preferred embodiment of the present disclosure, the repository building unit is further configured to, generate the semantic index vector of each piece of candidate news according to a tag of each piece of candidate news;

build the index repository according to the semantic index vectors of all candidate news.

According to a preferred embodiment of the present disclosure, the apparatus further comprises a model training unit;

the model training unit is configured to pre-train to obtain a first semantic index vector generating model and a second semantic index vector generating model;

the repository building unit inputs tags of candidate news into the first semantic index vector generating model to obtain the semantic index vectors of the candidate news;

the searching unit inputs the user's interest tag into the second semantic index vector generating model to obtain the user's semantic index vector.

According to a preferred embodiment of the present disclosure, the repository building unit builds M search trees, each search tree being a complete binary tree including at least two layers, each non-leaf node in each search tree corresponding to a semantic index vector;

and the repository building unit performs the following processing with respect to each piece of candidate news:

with respect to each search tree, respectively according to the semantic index vectors corresponding to non-leaf nodes therein and the semantic index vectors of the candidate news, determine a path from a first layer of non-leaf nodes to a leaf node, and regard the candidate news as candidate news corresponding to the leaf node on the path.

According to a preferred embodiment of the present disclosure, the repository building unit regards a first layer of non-leaf nodes in the search tree as a start of a path, regards the first layer of non-leaf nodes as to-be-processed non-leaf nodes, and performs the following predetermined processing:

perform linear projection for semantic index vectors of the candidate news and semantic index vectors corresponding to the to-be-processed non-leaf nodes, select a node from next layer of nodes of the to-be-processed non-leaf nodes according to a projection result, and add the node into the path;

when the selected node is a non-leaf node, regard the selected non-leaf node as the to-be-processed non-leaf node, and repeatedly perform the predetermined processing;

when the selected node is a leaf node, determine the candidate news as candidate news corresponding to the leaf node.

According to a preferred embodiment of the present disclosure, each non-leaf node in each search tree corresponds to a randomly-generated semantic index vector.

According to a preferred embodiment of the present disclosure, the searching unit regards a first layer of non-leaf nodes in the search tree as a start of a path, and regards the first layer of non-leaf nodes as to-be-processed non-leaf nodes, and performs the following predetermined processing:

perform linear projection for the user's semantic index vector and semantic index vectors corresponding to the to-be-processed non-leaf nodes, select a node from next layer of nodes of the to-be-processed non-leaf nodes according to a projection result, and add the node into the path;

when the selected node is a non-leaf node, regard the selected non-leaf node as the to-be-processed non-leaf node, and repeatedly perform the predetermined processing;

when the selected node is a leaf node, regard candidate news corresponding to the leaf node as a recall result.

According to a preferred embodiment of the present disclosure, when the projection result is positive, the selected node is a left node in the next layer of nodes; when the projection result is negative, the selected node is a right node in the next layer of nodes;

or, when the projection result is negative, the selected node is a left node in the next layer of nodes; when the projection result is positive, the selected node is a right node in the next layer of nodes.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As known from the above introduction, the solution of the present disclosure may be employed to generate the user's semantic index vector according to the user's interest tag, then search in the index repository according to the user's semantic index vector to determine the candidate news as the recall result, and thereby recommend the candidate news to the user, i.e., the user's interest is considered upon recommending the news. As compared the current manner 1), the present disclosure makes the recommendation result more purposeful and more relevant to the user, and thereby improves the accuracy of the news recommendation result.

In addition, the solution of the present disclosure is employed to build the index repository according to candidate news, the index repository including M search trees, each search tree being a complete binary tree including at least two layers, each non-leaf node in each search tree corresponding to a semantic index vector, each piece of candidate news corresponding to a leaf node in each search tree. As such, when search is performed, it is feasible to, with respect to each search tree, respectively according to the semantic index vectors corresponding to non-leaf nodes therein and the user's semantic index vector, determine a path from a first layer of non-leaf nodes in the search tree to a leaf node, and regard candidate news corresponding to the leaf node on the path as the recall result. As compared the current manner 2), in the present disclosure, it is unnecessary to calculate the semantic similarity between all candidate news and the user, thereby reducing the calculation complexity and the time spent in calculation.

DETAILED DESCRIPTION OF PREFERRED EMBODIMENTS

In view of problems existing in the prior art, the present disclosure provides a news recalling manner, namely, a news-recalling manner based on a semantic space: endow the news with semantic information through the sematic space, and perform news recall based on the semantic information.

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
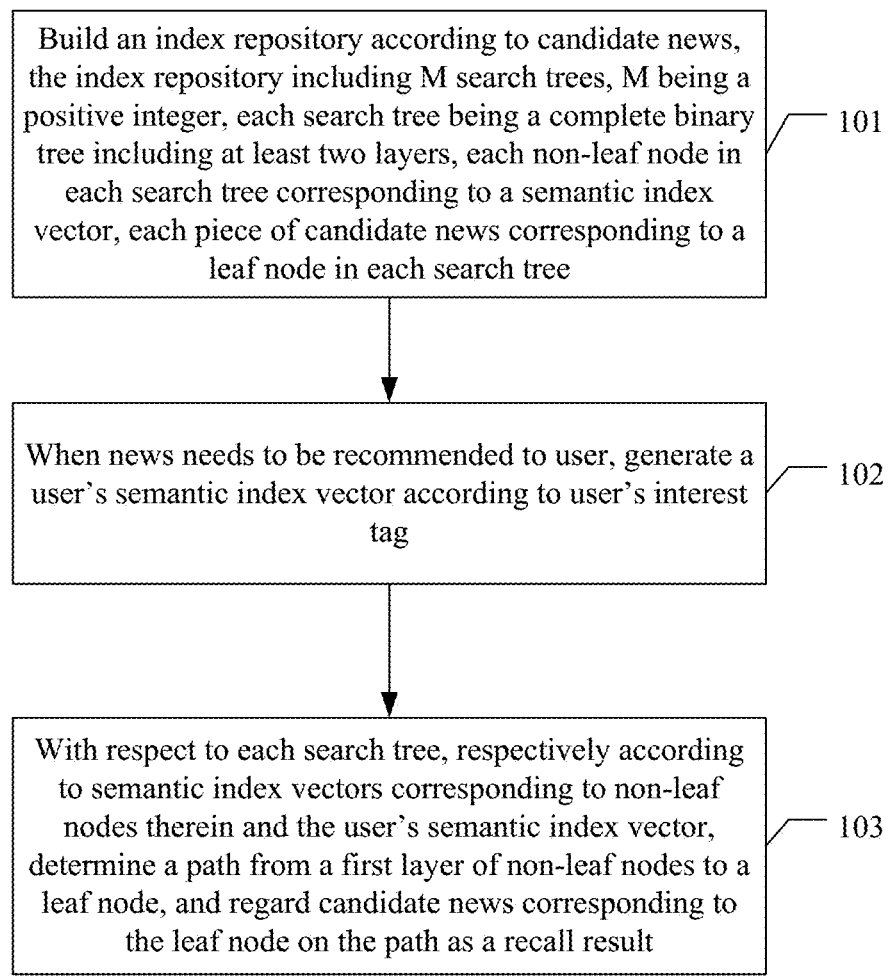
FIG. 1 is a flow chart of an embodiment of a method of recalling news based on artificial intelligence according to the present disclosure.

FIG. 1 is a flow chart of an embodiment of a method of recalling news based on artificial intelligence according to the present disclosure. As shown in FIG. 1, the embodiment comprises the following specific implementation mode.

In 101 is built an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree.

In 102, when news needs to be recommended to the user, a user's semantic index vector is generated according to the user's interest tag.

103 relates to, with respect to each search tree in the index repository, respectively according to the semantic index vectors corresponding to non-leaf nodes therein and the user's semantic index vector, determining a path from a first layer of non-leaf nodes to a leaf node, and regarding candidate news corresponding to the leaf node on the path as a recall result.

It is feasible to, according to a tag of each piece of candidate news, generate the semantic index vector of each piece of candidate news, and then build an index repository according to the semantic index vectors of all candidate news.

That is to say, all candidate news and users each have a tag, for example, tags of users and candidate news may respectively be:

User A: military, sports, World War II, Taiwan Strait, China football;

Candidate news 1: football, World Cup, Brazil, China, matches, champion;

Candidate news 2: entertainment, To the Sky Kingdom (Chinese expression: 三生 三世十里桃花), TV series, Empresses in the Palace.

The tags include the user's interest information and semantic information of candidate news.

How to obtain the tags of users and candidate news is of the prior art.

It is necessary to represent each of the tags of users and candidate news in the form of the semantic index vector.

Figure 2:
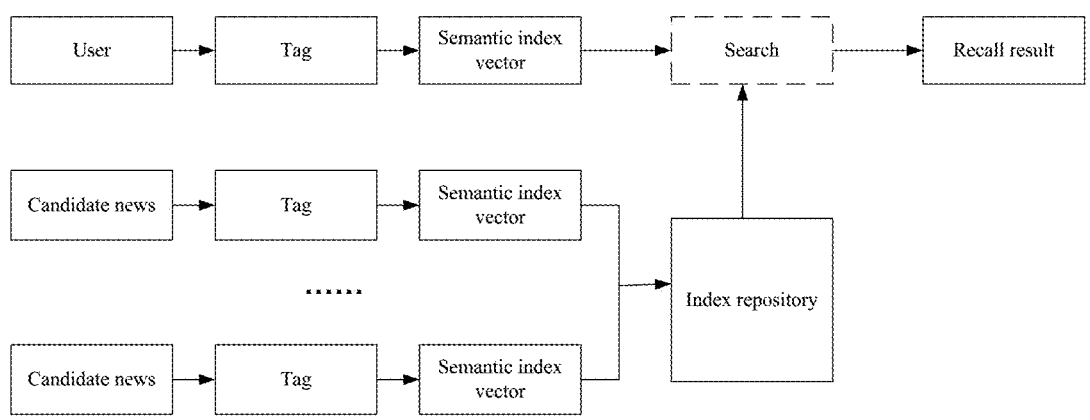
FIG. 2 is a schematic diagram of a news-recalling process based on artificial intelligence according to the present disclosure.

Correspondingly, FIG. 2 is a schematic diagram of a news-recalling process based on artificial intelligence according to the present disclosure. As shown in FIG. 2, it is feasible to generate the semantic index vector of each piece of candidate news according to the tag of each piece of candidate new, and then build an index repository according to the semantic index vectors of the candidate news, generate a user's semantic index vector according to the user's interest tag when news needs to be recommended to the user, then search in the index repository according to the user's semantic index vector to determine the candidate news as a recall result, and thereby recommend the candidate news to the user.

Specific implementations of the above portions will be respectively described below in detail.

1. Semantic Index Vector

The semantic index vector is a binary vector in a code form and a fixed-length vector formed by a series of 0 and 1, for example, (0, 1, 0, 0, 1, 1, 0, 1).

It is possible to obtain two semantic index vector generating models by pre-training, respectively called a first semantic index vector generating model and a second semantic index vector generating model, for ease of description. Assuming that the first semantic index vector generating model corresponds to candidate news and the second semantic index vector generating model corresponds to the user, it is feasible to, with respect to each piece of candidate news, input the tag of the piece of candidate news into the first semantic index vector generating model to obtain the semantic index vector of the piece of candidate news, and similarly, input the user's interest tag into the second semantic index vector generating model to obtain the user's semantic index vector.

Figure 3:
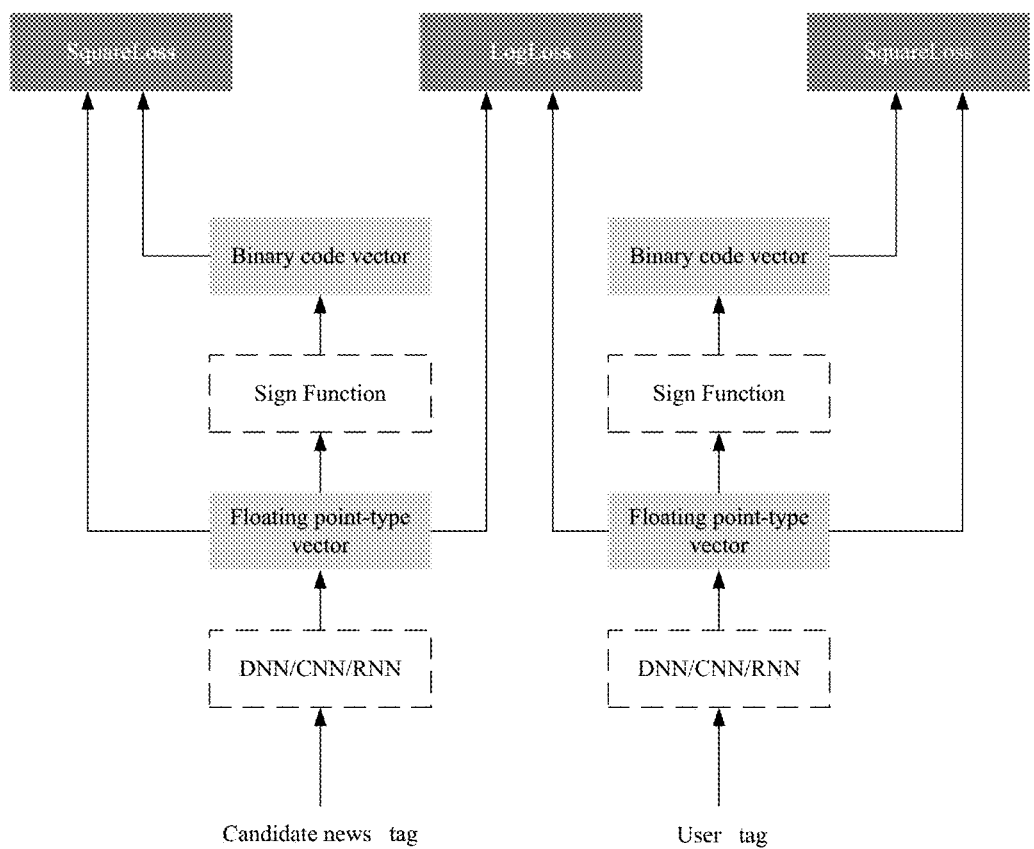
FIG. 3 is structural schematic diagram of a model of generating a semantic index vector according to the present disclosure.

The specific structure of the semantic index vector generating models is not limited here, for example, as shown in FIG. 3.

FIG. 3 is structural schematic diagram of a model of generating a semantic index vector according to the present disclosure. As shown in FIG. 3, optimization processing may be performed during training. The optimization target includes two portions:

1) Logloss optimizes semantic similarity between floating point-type vectors;

2) Squareloss optimizes a difference between the floating point-type vector and the binary code vector, and minimize the difference;

wherein a Convolution Neural Network (CNN), a Recurrent Neural Network (RNN) and a Deep Neural Network (DNN) all are a neural network model. Any one of them may be selected and used.

How to train to obtain the first semantic index vector generating model and the second semantic index vector generating model is of the prior art.

Then, the first semantic index vector generating model and the second semantic index vector generating model may be used to generate the semantic index vectors of the candidate news and the user.

2. Build an Index Repository

The index repository may be built according to semantic index vectors of all candidate news.

Specifically, it is feasible to first build M search trees, wherein M is a positive integer, and its specific value may depend on actual needs, i.e., the number of search trees may be 1 or larger than 1, usually larger than 1, that is, the index repository is a search forest formed by a plurality of search trees. The setting of the plurality of search trees may enhance generalization and diversity of subsequent recommendation results.

Each search tree is a complete binary tree including at least two layers, and each non-leaf node in each search tree corresponds to a semantic index vector.

The specific number of layers included by each search tree may depend on actual needs. In addition, the number of layers included in different search trees may be the same or different.

Each non-leaf node in each search tree corresponds to a randomly-generated semantic index vector, for example, the randomly-generated semantic index vector (0, 1, 0, 1, 0, 1, 0, 1).

After the M search trees are built, they may be respectively added to the index repository in the following manner with respect to each piece of candidate news:

with respect to each search tree, respectively according to the semantic index vectors corresponding to non-leaf nodes in the search tree and the semantic index vectors of the candidate news, determining a path from a first layer of non-leaf nodes in the search tree to a leaf node, and regarding the candidate news as candidate news corresponding to the leaf node on the path, namely, adding the candidate news into the search tree.

Figure 4:
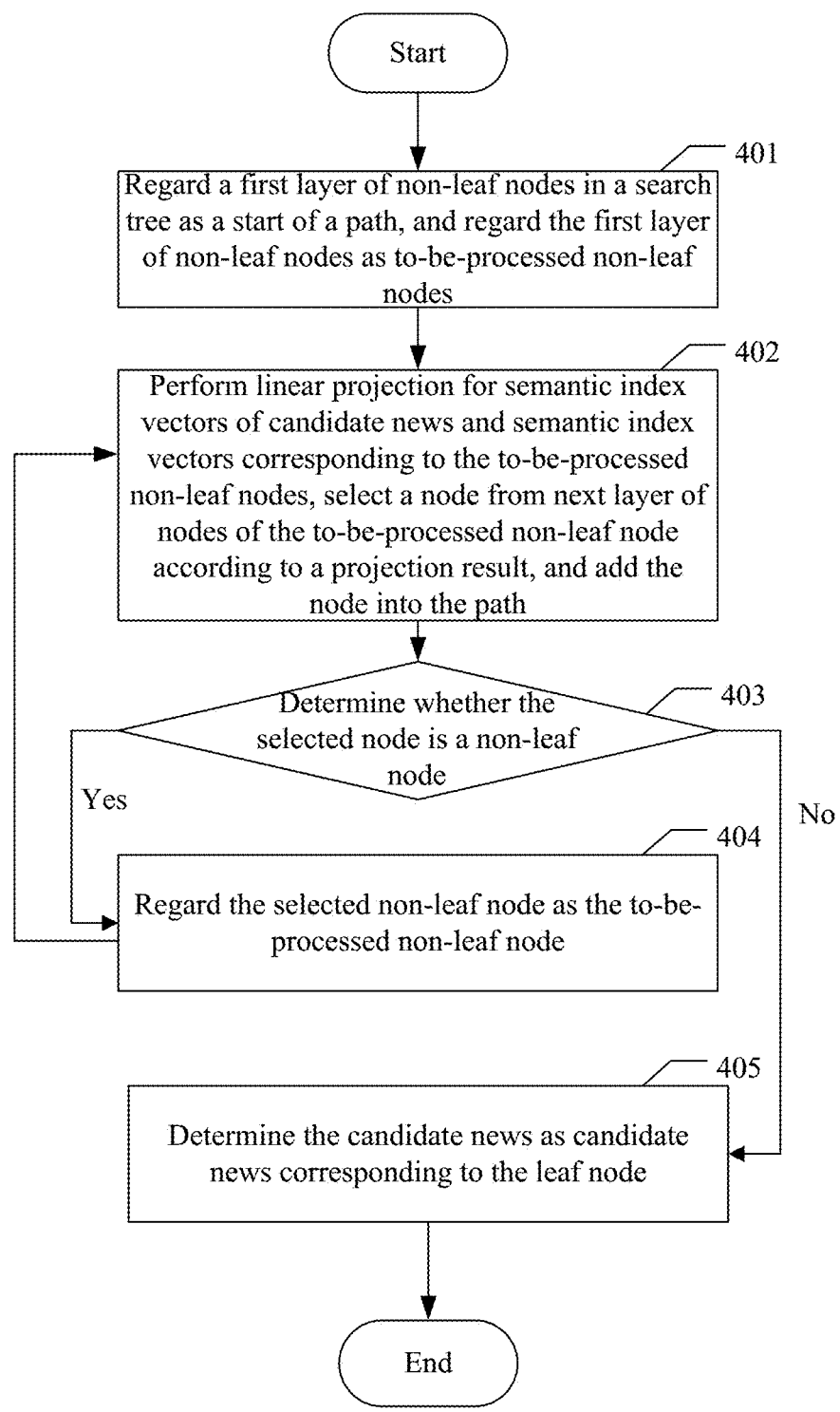
FIG. 4 is a flow chart of an embodiment of a method of determining a path and adding candidate news with respect to each search tree according to the present disclosure.

FIG. 4 is a flow chart of an embodiment of a method of determining a path and adding candidate news with respect to each search tree according to the present disclosure. As shown in FIG. 4, the embodiment comprises the following specific implementation mode.

In 401, regard a first layer of non-leaf nodes in a search tree as a start of a path, and regard the first layer of non-leaf nodes as to-be-processed non-leaf nodes, and perform 402.

402 relates to performing linear projection for semantic index vectors of candidate news and semantic index vectors corresponding to the to-be-processed non-leaf nodes, selecting a node from next layer of nodes of the to-be-processed non-leaf node according to a projection result, and adding the node into the path.

For example, when the projection result is positive, a left node in the next layer of nodes is regarded as the selected node; when the projection result is negative, a right node in the next layer of nodes is regarded as the selected node.

Alternatively, when the projection result is negative, a left node in the next layer of nodes is regarded as the selected node; when the projection result is positive, a right node in the next layer of nodes is regarded as the selected node.

That is, it is feasible to decide to further go leftward or rightward according to positivity and negativity of the projection result, until reaching the leaf node.

How to perform linear projection is of the prior art.

403 relates to determining whether the selected node is a non-leaf node, and performing 404 if yes, or performing 405 if no.

404 relates to regarding the selected non-leaf node as the to-be-processed non-leaf node, and repeatedly performing 402.

405 relates to determining the candidate news as candidate news corresponding to the leaf node, and finishing the process.

The construction of the index repository may be completed by processing each piece of candidate news in the above manner.

Figure 5:
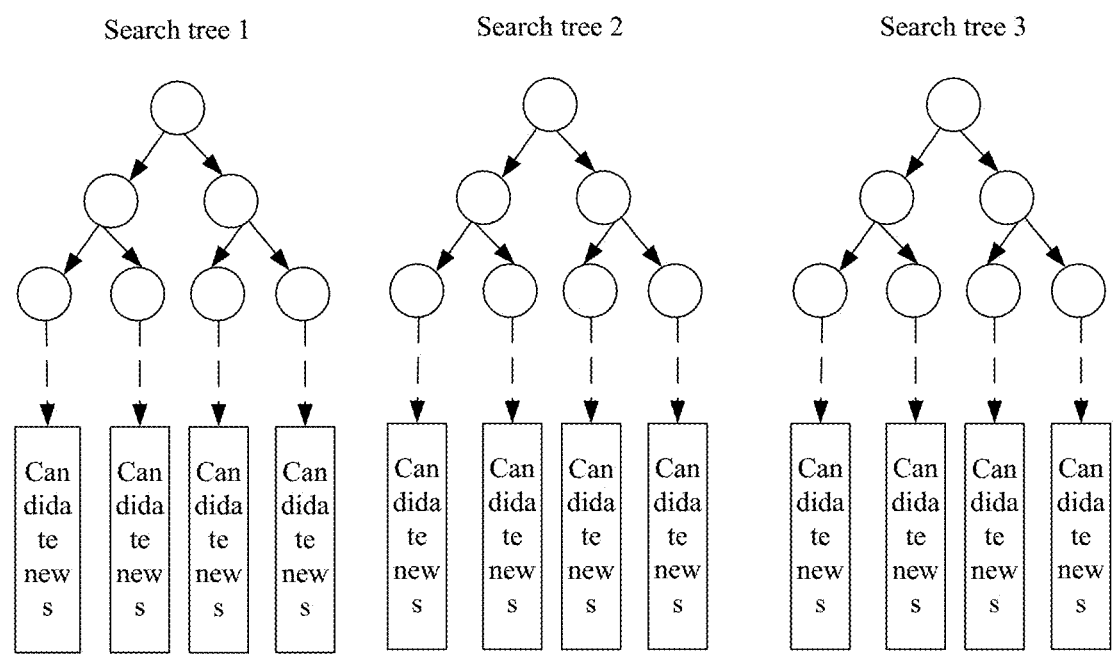
FIG. 5 is a schematic diagram of a built index repository according to the present disclosure.

FIG. 5 is a schematic diagram of a built index repository according to the present disclosure. As shown in FIG. 5, assuming that there are included a total of three search trees: search tree 1, search tree 2 and search tree 3, and assuming that there are totally 1000 pieces of candidate news, the sum of the number of candidate news corresponding to leaf nodes in search tree 1 will be 1000, similarly, the sum of the number of candidate news corresponding to leaf nodes in each of search tree 2 and search tree 3 will be also 1000, and each leaf node may correspond to a plurality of pieces of candidate news.

3. Search

After the building of the index repository is completed, when news needs to be recommended to any user, it is feasible to search in the index repository according to the user's semantic index vector, then determine the candidate news as the recall result and thereby recommend the candidate news to the user.

Specifically, it is feasible to, with respect to each search tree in the index repository, respectively according to the semantic index vectors corresponding to non-leaf nodes in the search tree and the semantic index vector of the user, determine a path from a first layer of non-leaf nodes in the search tree to a leaf node, and regard the candidate news corresponding to the leaf node on the path as the recall result.

Figure 6:
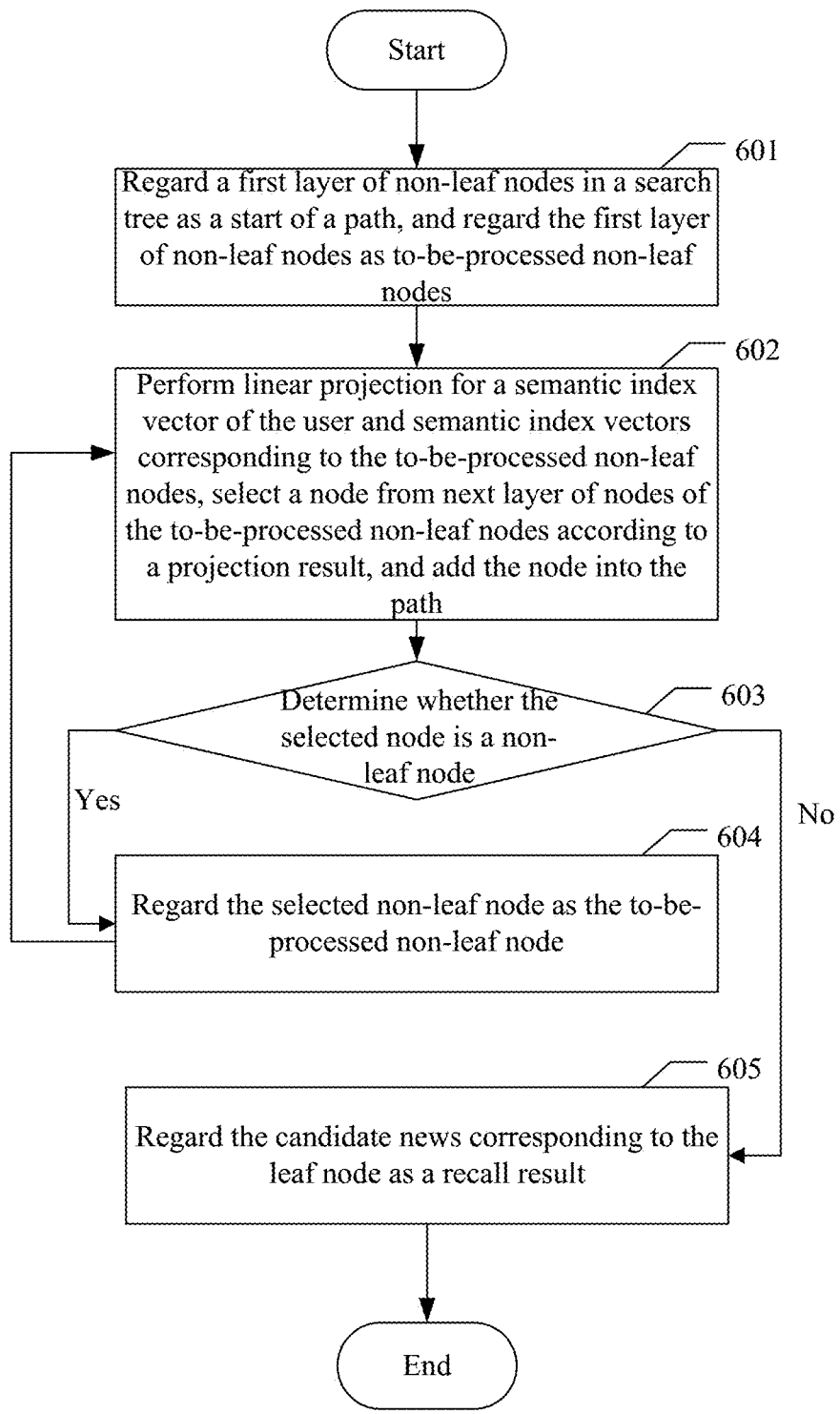
FIG. 6 is a flow chart of an embodiment of a method of determining a path and recalling news with respect to each search tree according to the present disclosure.

FIG. 6 is a flow chart of an embodiment of a method of determining a path and recalling news with respect to each search tree according to the present disclosure. As shown in FIG. 6, the embodiment comprises the following specific implementation mode.

601 relates to regarding a first layer of non-leaf nodes in a search tree as a start of a path, and regarding the first layer of non-leaf nodes as to-be-processed non-leaf nodes, and perform 602.

602 relates to performing linear projection for a semantic index vector of the user and semantic index vectors corresponding to the to-be-processed non-leaf nodes, selecting a node from next layer of nodes of the to-be-processed non-leaf nodes according to a projection result, and adding the node into the path.

For example, when the projection result is positive, a left node in the next layer of nodes is regarded as the selected node; when the projection result is negative, a right node in the next layer of nodes is regarded as the selected node.

Alternatively, when the projection result is negative, a left node in the next layer of nodes is regarded as the selected node; when the projection result is positive, a right node in the next layer of nodes is regarded as the selected node.

That is, it is feasible to decide to further go leftward or rightward according to positivity and negativity of the projection result, until reaching the leaf node.

603 relates to determining whether the selected node is a non-leaf node, and performing 604 if yes, or performing 605 if no.

604 relates to regarding the selected non-leaf node as the to-be-processed non-leaf node, and repeatedly performing 602.

605 relates to regarding the candidate news corresponding to the leaf node as a recall result, and finishing the process.

It is feasible to perform processing in the above manner with respect to each search tree to determine the candidate news in the search tree as the recall result, and then recommend the candidate news to the user.

Figure 7:
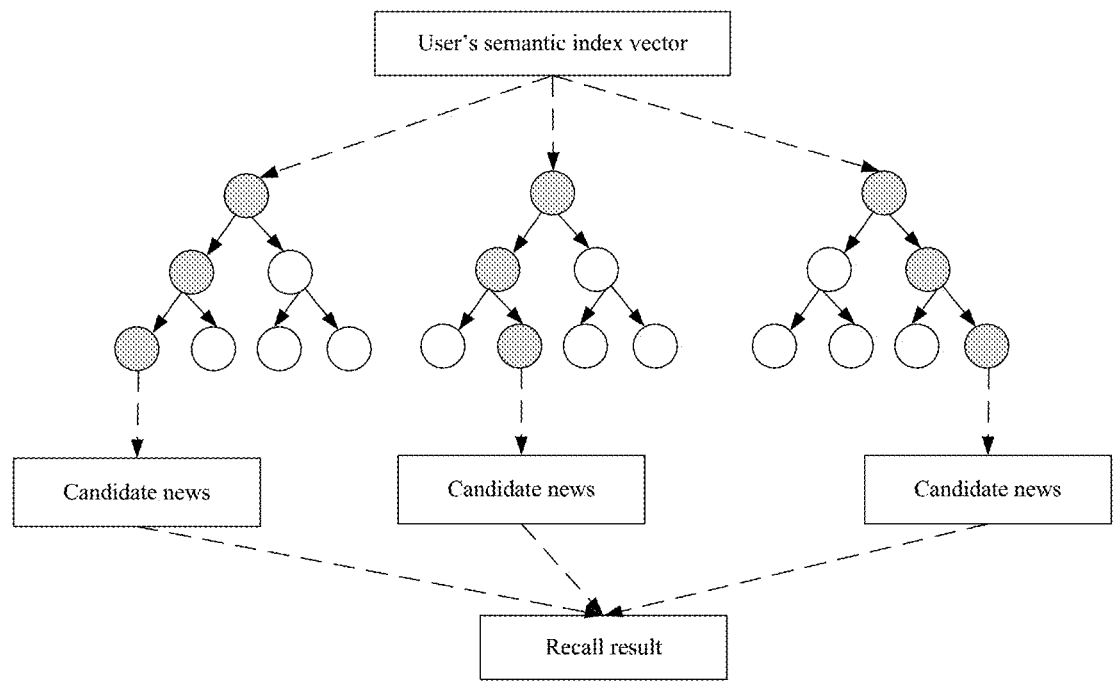
FIG. 7 is a schematic diagram of a manner of recalling news according to a user's semantic index vector according to the present disclosure.

Concluding the above introduction, FIG. 7 is a schematic diagram of a manner of recalling news according to a user's semantic index vector according to the present disclosure. As shown in FIG. 7, assuming that there are totally three search trees, it is possible to determine a path from each search tree according to the user's semantic index vector, and respectively regard the candidate news corresponding to the leaf nodes in each path as the recall results.

It needs to be appreciated that candidate news corresponding to leaf nodes in the paths might be repetitious, it is feasible to first perform deduplication processing and then recommend to the user.

As known from the above introduction, the solution of the present disclosure may be employed to generate the user's semantic index vector according to the user's interest tag, then search in the index repository according to the user's semantic index vector to determine the candidate news as the recall result, and thereby recommend the candidate news to the user, i.e., the user's interest is considered upon recommending the news. As compared the current manner 1), the present disclosure makes the recommendation result more purposeful more relevant to the user, and thereby improves the accuracy of the news recommendation result.

In addition, the solution of the present disclosure is employed to build the index repository according to candidate news, the index repository including M search trees, each search tree being a complete binary tree including at least two layers, each non-leaf node in each search tree corresponding to a semantic index vector, each piece of candidate news corresponding to a leaf node in each search tree. As such, when search is performed, it is feasible to, with respect to each search tree, respectively according to the semantic index vectors corresponding to non-leaf nodes therein and the user's semantic index vector, determine a path from a first layer of non-leaf nodes in the search tree to a leaf node, and regard candidate news corresponding to the leaf node on the path as the recall result. As compared the current manner 2), in the present disclosure, it is unnecessary to calculate the semantic similarity between all candidate news and the user, thereby reducing the calculation complexity and the time spent in calculation.

The above introduces the method embodiments. The solution of the present disclosure will be further described through an apparatus embodiment.

Figure 8:
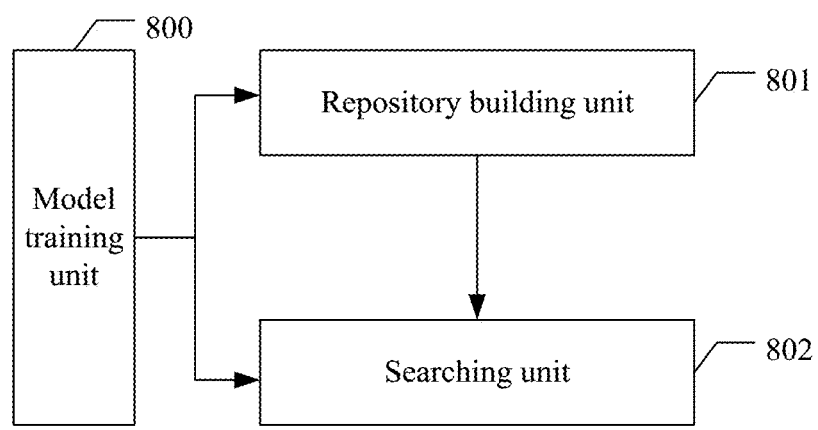
FIG. 8 is a block diagram of an apparatus of recalling news based on artificial intelligence according to the present disclosure.

FIG. 8 is a block diagram of an apparatus of recalling news based on artificial intelligence according to the present disclosure. The apparatus comprises a repository building unit 801 and a searching unit 802.

The repository building unit 801 is configured to build an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree.

The searching unit 802 is configured to, when news needs to be recommended to the user, generate a user's semantic index vector according to the user's interest tag; with respect to each search tree in the index repository, respectively according to the semantic index vectors corresponding to non-leaf nodes therein and the user's semantic index vector, determine a path from a first layer of non-leaf nodes to a leaf node, and regard candidate news corresponding to the leaf node on the path as a recall result.

Wherein, the repository building unit 801 may, according to a tag of each piece of candidate news, generate the semantic index vector of each piece of candidate news, and then build the index repository according to the semantic index vectors of all candidate news.

That is to say, all candidate news and users each have a tag, for example, tags of users and candidate news may respectively be:

User A: military, sports, World War II, Taiwan Strait, China football;

Candidate news 1: football, World Cup, Brazil, China, matches, champion;

Candidate news 2: entertainment, To the Sky Kingdom (Chinese expression: 二生 三世十里桃花 TV series, Empresses in the Palace.

The tags include the user's interest information and semantic information of candidate news.

How to obtain the tags of users and candidate news is of the prior art.

It is necessary to represent each of the tags of users and candidate news in the form of the semantic index vector.

The semantic index vector is a binary vector in a code form and a fixed-length vector formed by a series of 0 and 1.

As shown in FIG. 8, the apparatus according to the present embodiment further comprises a model training unit 800.

The model training unit 800 is configured to pre-train to obtain a first semantic index vector generating model and a second semantic index vector generating model.

Correspondingly, the repository building unit 801 may input tags of pieces of candidate news into the first semantic index vector generating model to obtain the semantic index vectors of the pieces of candidate news.

The searching unit 802 may input the user's interest tag into the second semantic index vector generating model to obtain the user's semantic index vector.

The repository building unit 801 may build the index repository according to the semantic index vectors of the pieces of candidate news.

Specifically, the repository building unit 801 may first build M search trees, wherein M is a positive integer, and its specific value may depend on actual needs.

Each search tree is a complete binary tree including at least two layers, and each non-leaf node in each search tree corresponds to a semantic index vector.

The specific number of layers included by each search tree may depend on actual needs. In addition, the number of layers included in different search trees may be the same or different.

Each non-leaf node in each search tree may corresponds to a randomly-generated semantic index vector.

After the M search trees are built, the repository building unit 801 may perform the following processing with respect to each piece of candidate news:

with respect to each search tree, respectively according to the semantic index vectors corresponding to non-leaf nodes therein and the semantic index vectors of the candidate news, determine a path from a first layer of non-leaf nodes to a leaf node, and regard the candidate news as candidate news corresponding to the leaf node on the path.

For example, the repository building unit 801 may regard a first layer of non-leaf nodes in the search tree as a start of a path, and regard the first layer of non-leaf nodes as to-be-processed non-leaf nodes, and perform the following predetermined processing:

perform linear projection for semantic index vectors of candidate news and semantic index vectors corresponding to the to-be-processed non-leaf nodes, select a node from next layer of nodes of the to-be-processed non-leaf nodes according to a projection result, and add the node into the path;

when the selected node is a non-leaf node, regard the selected non-leaf node as the to-be-processed non-leaf node, and repeatedly perform the predetermined processing;

when the selected node is a leaf node, determine the candidate news as candidate news corresponding to the leaf node.

Wherein when the projection result is positive, the selected node is a left node in the next layer of nodes; when the projection result is negative, the selected node is a right node in the next layer of nodes; or, when the projection result is negative, the selected node is a left node in the next layer of nodes; when the projection result is positive, the selected node is a right node in the next layer of nodes.

After the building of the index repository is completed, when news needs to be recommended to any user, the searching unit 802 searches in the index repository according to the user's semantic index vector, then determines the candidate news as the recall result and thereby recommends the candidate news to the user.

Specifically, with respect to each search tree in the index repository, the searching unit 802, respectively according to the semantic index vectors corresponding to non-leaf nodes in the search tree and the semantic index vector of the user, determines a path from a first layer of non-leaf nodes in the search tree to a leaf node, and regards the candidate news corresponding to the leaf node on the path as the recall result.

For example, the searching unit 802 may regard a first layer of non-leaf nodes in the search tree as a start of a path, and regard the first layer of non-leaf nodes as to-be-processed non-leaf nodes, and perform the following predetermined processing:

perform linear projection for the user's semantic index vector and semantic index vectors corresponding to the to-be-processed non-leaf nodes, select a node from next layer of nodes of the to-be-processed non-leaf nodes according to a projection result, and add the node into the path;

when the selected node is a non-leaf node, regard the selected non-leaf node as the to-be-processed non-leaf node, and repeatedly perform the predetermined processing;

when the selected node is a leaf node, determine candidate news corresponding to the leaf node as a recall result.

Wherein when the projection result is positive, the selected node is a left node in the next layer of nodes; when the projection result is negative, the selected node is a right node in the next layer of nodes; or when the projection result is negative, the selected node is a left node in the next layer of nodes; when the projection result is positive, the selected node is a right node in the next layer of nodes.

Figure 9:
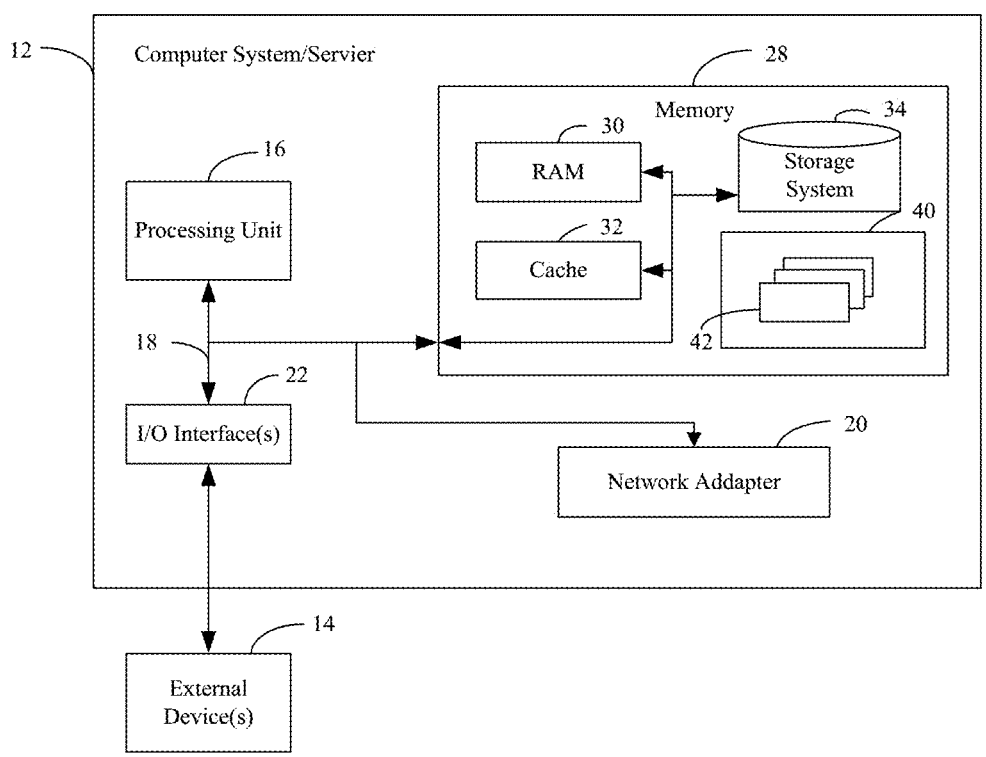
FIG. 9 illustrates a block diagram of an example computer system/server 12 adapted to implement an implementation mode of the present disclosure.

Reference may be made to corresponding depictions in the aforesaid method embodiment for a specific workflow of the apparatus embodiment shown in FIG. 8. The workflow is not detailed any more FIG. 9 illustrates a block diagram of an example computer system/server 12 adapted to implement an implementation mode of the present disclosure. The computer system/server 12 shown in FIG. 9 is only an example and should not bring about any limitation to the function and scope of use of the embodiments of the present disclosure.

As shown in FIG. 9, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 9, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 1, namely, build an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree; when news needs to be recommended to the user, generate a user's semantic index vector according to the user's interest tag; with respect to each search tree in the index repository, respectively according to the semantic index vectors corresponding to non-leaf nodes therein and the user's semantic index vector, determine a path from a first layer of non-leaf nodes to a leaf node, and regard candidate news corresponding to the leaf node on the path as a recall result.

Reference may be made to related depictions in the above embodiments for specific implementations, which will not be detailed any more.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for recalling news based on artificial intelligence, wherein the method comprises:
building an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree;
when news needs to be recommended to a user, generating the user's semantic index vector according to the user's interest tag;
with respect to each search tree, regarding a first layer of non-leaf nodes in the search tree as a start of a path, and regarding the first layer of non-leaf nodes as to-be-processed non-leaf nodes, determining a path from a first layer of non-leaf nodes to a leaf node, and regarding candidate news corresponding to the leaf node on the path as a recall result by performing the following processing:
performing linear projection for the user's semantic index vector and semantic index vectors corresponding to the to-be-processed non-leaf nodes, selecting a node from next layer of nodes of the to-be-processed non-leaf nodes according to a projection result, and adding the node into the path; wherein the selecting a node from next layer of nodes of the to-be-processed non-leaf nodes according to a projection result comprises: when the projection result is positive, regarding a left node in the next layer of nodes as the selected node, when the projection result is negative, regarding a right node in the next layer of nodes as the selected node; or, when the projection result is negative, regarding a left node in the next layer of nodes as the selected node, when the projection result is positive, regarding a right node in the next layer of nodes as the selected node;
when the selected node is a non-leaf node, regarding the selected non-leaf node as the to-be-processed non-leaf node, and repeatedly performing the predetermined processing;
when the selected node is a leaf node, regarding candidate news corresponding to the leaf node as the recall result.

2. The method according to claim 1, wherein
the building an index repository according to candidate news comprises:
generating a semantic index vector of each piece of candidate news according to a tag of each piece of candidate news;
building the index repository according to semantic index vectors of all candidate news.

3. The method according to claim 2, wherein
the generating a semantic index vector of each piece of candidate news according to a tag of each piece of candidate news comprises:
inputting tags of the candidate news into a first semantic index vector generating model obtained by pre-training, to obtain the semantic index vectors of the candidate news;
the generating a user's semantic index vector according to the user's interest tag comprises:
inputting the user's interest tag into a second semantic index vector generating model obtained by per-training, to obtain the user's semantic index vector.

4. The method according to claim 2, wherein
the building the index repository according to semantic index vectors of all candidate news comprises:
building M search trees, each search tree being a complete binary tree including at least two layers, each non-leaf node in each search tree corresponding to a semantic index vector;

performing the following processing with respect to each piece of candidate news:

with respect to each search tree, respectively according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path.

5. The method according to claim 4, wherein
the step of, according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path comprises:

regarding a first layer of non-leaf nodes in the search tree as a start of a path, regarding the first layer of non-leaf nodes as to-be-processed non-leaf nodes, and performing the following predetermined processing:

performing linear projection for semantic index vectors of the candidate news and semantic index vectors corresponding to the to-be-processed non-leaf nodes, selecting a node from next layer of nodes of the to-be-processed non-leaf nodes according to a projection result, and adding the node into the path;

when the selected node is a non-leaf node, regarding the selected non-leaf node as the to-be-processed non-leaf node, and repeatedly performing the predetermined processing;

when the selected node is a leaf node, determining the candidate news as candidate news corresponding to the leaf node.

6. The method according to claim 1, wherein
the each non-leaf node in each search tree corresponding to a semantic index vector comprises:

each non-leaf node in each search tree corresponds to a randomly-generated semantic index vector.

7. A computer device, comprising a memory, a processor and a computer program which is stored on the memory and runs on the processor, wherein the processor, upon executing the program, implements the following operation:

building an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree;

when news needs to be recommended to a user, generating the user's semantic index vector according to the user's interest tag;

with respect to each search tree, regarding a first layer of non-leaf nodes in the search tree as a start of a path, and regarding the first layer of non-leaf nodes as to-be-processed non-leaf nodes, determining a path from a first layer of non-leaf nodes to a leaf node, and regarding candidate news corresponding to the leaf node on the path as a recall result by performing the following processing:

performing linear projection for the user's semantic index vector and semantic index vectors corresponding to the to-be-processed non-leaf nodes, selecting a node from next layer of nodes of the to-be-processed non-leaf nodes according to a projection result, and adding the node into the path; wherein the selecting a node from next layer of nodes of the to-be-processed non-leaf nodes according to a projection result comprises: when the projection result is positive, regarding a left node in the next layer of nodes as the selected node, when the projection result is negative, regarding a right node in the next layer of nodes as the selected node; or, when the projection result is negative, regarding a left node in the next layer of nodes as the selected node, when the projection result is positive, regarding a right node in the next layer of nodes as the selected node;

when the selected node is a non-leaf node, regarding the selected non-leaf node as the to-be-processed non-leaf node, and repeatedly performing the predetermined processing;

when the selected node is a leaf node, regarding candidate news corresponding to the leaf node as the recall result.

8. The computer device according to claim 7, wherein
the building an index repository according to candidate news comprises:

generating a semantic index vector of each piece of candidate news according to a tag of each piece of candidate news;

building the index repository according to semantic index vectors of all candidate news.

9. The computer device according to claim 8, wherein
the generating a semantic index vector of each piece of candidate news according to a tag of each piece of candidate news comprises:

inputting tags of the candidate news into a first semantic index vector generating model obtained by pre-training, to obtain the semantic index vectors of the candidate news;

the generating a user's semantic index vector according to the user's interest tag comprises:

inputting the user's interest tag into a second semantic index vector generating model obtained by per-training, to obtain the user's semantic index vector.

10. The computer device according to claim 8, wherein
the building the index repository according to semantic index vectors of all candidate news comprises:

building M search trees, each search tree being a complete binary tree including at least two layers, each non-leaf node in each search tree corresponding to a semantic index vector;

performing the following processing with respect to each piece of candidate news:

with respect to each search tree, respectively according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path.

11. The computer device according to claim 10, wherein
the operation of, according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path comprises:

regarding a first layer of non-leaf nodes in the search tree as a start of a path, regarding the first layer of non-leaf nodes as to-be-processed non-leaf nodes, and performing the following predetermined processing:

performing linear projection for semantic index vectors of the candidate news and semantic index vectors corresponding to the to-be-processed non-leaf nodes, selecting a node from next layer of nodes of the to-beprocessed non-leaf nodes according to a projection result, and adding the node into the path;

when the selected node is a non-leaf node, regarding the selected non-leaf node as the to-be-processed non-leaf node, and repeatedly performing the predetermined processing;

when the selected node is a leaf node, determining the candidate news as candidate news corresponding to the leaf node.

12. The computer device according to claim 7, wherein the each non-leaf node in each search tree corresponding to a semantic index vector comprises:

each non-leaf node in each search tree corresponds to a randomly-generated semantic index vector.

13. A computer-readable storage medium on which a computer program is stored, wherein the program, when executed by a processor, implements the following operation:

building an index repository according to candidate news, the index repository including M search trees, M being a positive integer, each search tree being a complete binary tree including at least two layers, each non-leaf node in each search tree corresponding to a semantic index vector, each piece of candidate news corresponding to a leaf node in each search tree;

when news needs to be recommended to a user, generating the user's semantic index vector according to the user's interest tag;

with respect to each search tree, regarding a first layer of non-leaf nodes in the search tree as a start of a path, and regarding the first layer of non-leaf nodes as to-be-processed non-leaf nodes, determining a path from a first layer of non-leaf nodes to a leaf node, and regarding candidate news corresponding to the leaf node on the path as a recall result by performing the following processing:

performing linear projection for the user's semantic index vector and semantic index vectors corresponding to the to-be-processed non-leaf nodes, selecting a node from next layer of nodes of the to-be-processed non-leaf nodes according to a projection result, and adding the node into the path; wherein the selecting a node from next layer of nodes of the to-be-processed non-leaf nodes according to a projection result comprises: when the projection result is positive, regarding a left node in the next layer of nodes as the selected node, when the projection result is negative, regarding a right node in the next layer of nodes as the selected node; or, when the projection result is negative, regarding a left node in the next layer of nodes as the selected node, when the projection result is positive, regarding a right node in the next layer of nodes as the selected node;

when the selected node is a non-leaf node, regarding the selected non-leaf node as the to-be-processed non-leaf node, and repeatedly performing the predetermined processing;

when the selected node is a leaf node, regarding candidate news corresponding to the leaf node as the recall result.

14. The computer-readable storage medium device according to claim 13, wherein the building an index repository according to candidate news comprises:

generating a semantic index vector of each piece of candidate news according to a tag of each piece of candidate news;

building the index repository according to semantic index vectors of all candidate news.

15. The computer-readable storage medium according to claim 14, wherein the generating a semantic index vector of each piece of candidate news according to a tag of each piece of candidate news comprises:

inputting tags of the candidate news into a first semantic index vector generating model obtained by pre-training, to obtain the semantic index vectors of the candidate news;

the generating a user's semantic index vector according to the user's interest tag comprises:

inputting the user's interest tag into a second semantic index vector generating model obtained by per-training, to obtain the user's semantic index vector.

16. The computer-readable storage medium according to claim 14, wherein the building the index repository according to semantic index vectors of all candidate news comprises:

building M search trees, each search tree being a complete binary tree including at least two layers, each non-leaf node in each search tree corresponding to a semantic index vector;

performing the following processing with respect to each piece of candidate news:

with respect to each search tree, respectively according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path.

17. The computer-readable storage medium according to claim 16, wherein the operation of, according to semantic index vectors corresponding to non-leaf nodes therein and semantic index vectors of the candidate news, determining a path from a first layer of non-leaf nodes to a leaf node, and regarding the candidate news as candidate news corresponding to the leaf node on the path comprises:

regarding a first layer of non-leaf nodes in the search tree as a start of a path, regarding the first layer of non-leaf nodes as to-be-processed non-leaf nodes, and performing the following predetermined processing:

performing linear projection for semantic index vectors of the candidate news and semantic index vectors corresponding to the to-be-processed non-leaf nodes, selecting a node from next layer of nodes of the to-be-processed non-leaf nodes according to a projection result, and adding the node into the path;

when the selected node is a non-leaf node, regarding the selected non-leaf node as the to-be-processed non-leaf node, and repeatedly performing the predetermined processing;

when the selected node is a leaf node, determining the candidate news as candidate news corresponding to the leaf node.

18. The computer-readable storage medium according to claim 13, wherein the each non-leaf node in each search tree corresponding to a semantic index vector comprises:

each non-leaf node in each search tree corresponds to a randomly-generated semantic index vector.

* * * * *